(12) United States Patent
Aoki et al.

(10) Patent No.: US 11,978,443 B2
(45) Date of Patent: May 7, 2024

(54) CONVERSATION ASSISTANCE DEVICE, CONVERSATION ASSISTANCE METHOD, AND PROGRAM

(71) Applicant: Nippon Telegraph and Telephone Corporation, Tokyo (JP)

(72) Inventors: Ryosuke Aoki, Tokyo (JP); Munenori Koyasu, Tokyo (JP); Naoki Oshima, Tokyo (JP); Naoki Mukawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 720 days.

(21) Appl. No.: 16/973,285

(22) PCT Filed: Jun. 7, 2019

(86) PCT No.: PCT/JP2019/022720
§ 371 (c)(1),
(2) Date: Dec. 8, 2020

(87) PCT Pub. No.: WO2019/240035
PCT Pub. Date: Dec. 19, 2019

(65) Prior Publication Data
US 2021/0249007 A1    Aug. 12, 2021

(30) Foreign Application Priority Data

Jun. 13, 2018 (JP) .................................. 2018-112706

(51) Int. Cl.
*G10L 15/22* (2006.01)
(52) U.S. Cl.
CPC ........ *G10L 15/22* (2013.01); *G10L 2015/225* (2013.01)

(58) Field of Classification Search
CPC ... G10L 15/00; G10L 15/22; G10L 2015/225; G10L 25/51; H04N 7/14
See application file for complete search history.

(56) References Cited

U.S. PATENT DOCUMENTS

| 6,785,649 B1* | 8/2004 | Hoory | ..................... G10L 13/08 |
| | | | 704/235 |
| 2015/0269929 A1* | 9/2015 | Emery | ..................... G10L 15/10 |
| | | | 704/254 |

(Continued)

FOREIGN PATENT DOCUMENTS

| JP | 2010-256391 | 11/2010 |
| JP | 201797093 | 6/2017 |
| WO | WO 2018/016139 | 1/2018 |

OTHER PUBLICATIONS

Hanawa et al., "Communication support by a native speaker's entering keywords on discussion with a non-native speaker—Effects of entering keywords by a native speaker on audio conference," IEICE Technical Report, May 2016, pp. 139-144, 16 pages (with English Translation).

(Continued)

*Primary Examiner* — Angela A Armstrong
(74) *Attorney, Agent, or Firm* — Fish & Richardson P.C.

(57) ABSTRACT

Implemented is a communication with reasonably smooth conversation even between people having different proficiency levels in a common language. Included are a voice recognition unit (14) that acquires a speech rate of a speaker and recognizes a voice on a speech content; and a call voice processing unit (12) that processes a part of a voice recognition result based on a result of comparing the acquired speech rate with a reference speech rate, and transmits a video on which a text character image of the voice recog- (Continued)

nition result having been processed is superimposed to a communication terminal TM of the speaker.

7 Claims, 2 Drawing Sheets

(56) References Cited

U.S. PATENT DOCUMENTS

2017/0148469 A1    5/2017  Furuta et al.
2018/0286389 A1*  10/2018  Kawachi ................ G10L 15/22
2019/0147870 A1    5/2019  Taki et al.

OTHER PUBLICATIONS

Koyasu et al., "Proposal of Japanese Conversation Support System for Non-native Speaker—Promote Slow Utterances of Native Speakers and Visualize Spoken Sentences," Poster, Human Communication Group Symposium 2017, Dec. 13, 2017, 3 pages (with English Translation).

Koyasu et al., "Proposal of Japanese Conversation Support System for Non-native Speaker—Promote Slow Utterances of Native Speakers and Visualize Spoken Sentences," The Institute of Electronics, Information and Communication Engineers, Human Communication Group Symposium 2017, Dec. 13, 2017, 11 pages (with English Translation).

Koyasu et al., "Proposal of Japanese Conversation Support System for Non-native Speaker—Promote Slow Utterances of Native Speakers and Visualize Spoken Sentences," Presentation, Human Communication Group Symposium 2017, Dec. 13, 2017, 3 pages (with English Translation).

Osanai et al., "Comparison of audio-visual synchronous/asynchronous playback in real-time speech rate converted conversions—Will the speaker's addressing strength change? ," IEICE Technical Report, Apr. 2017, 13 pages (with English Translation).

* cited by examiner

[Fig. 1]
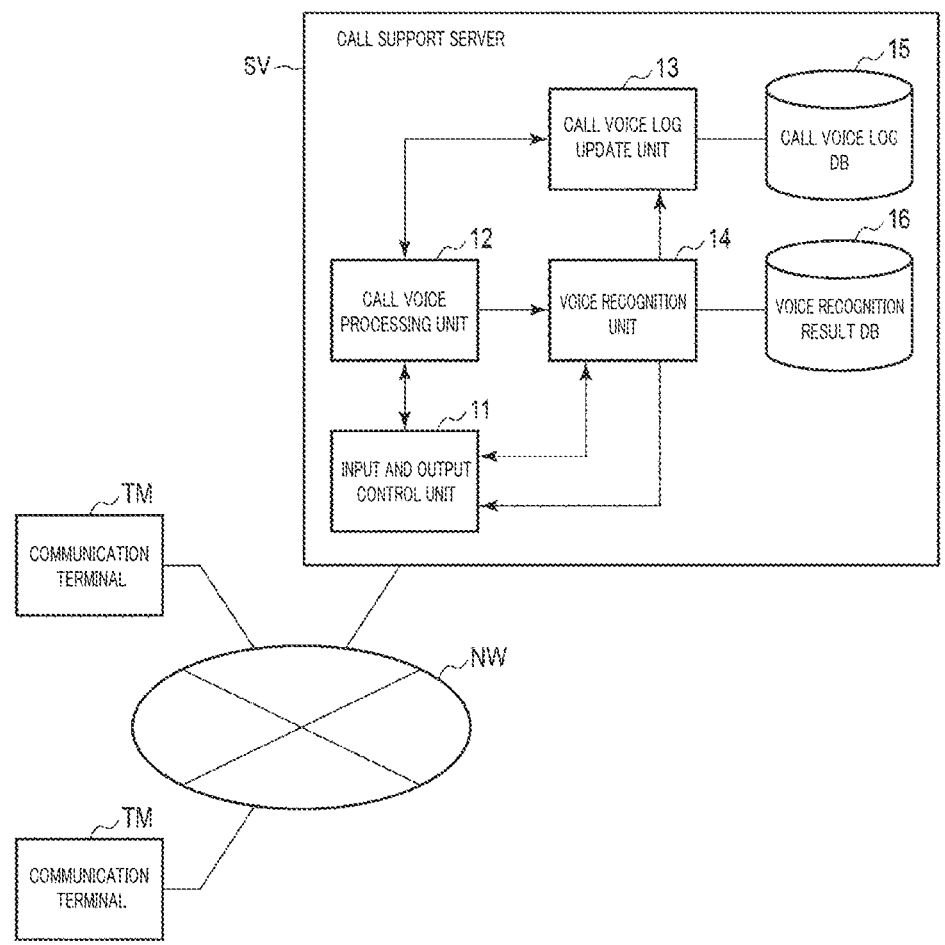

[Fig. 2]
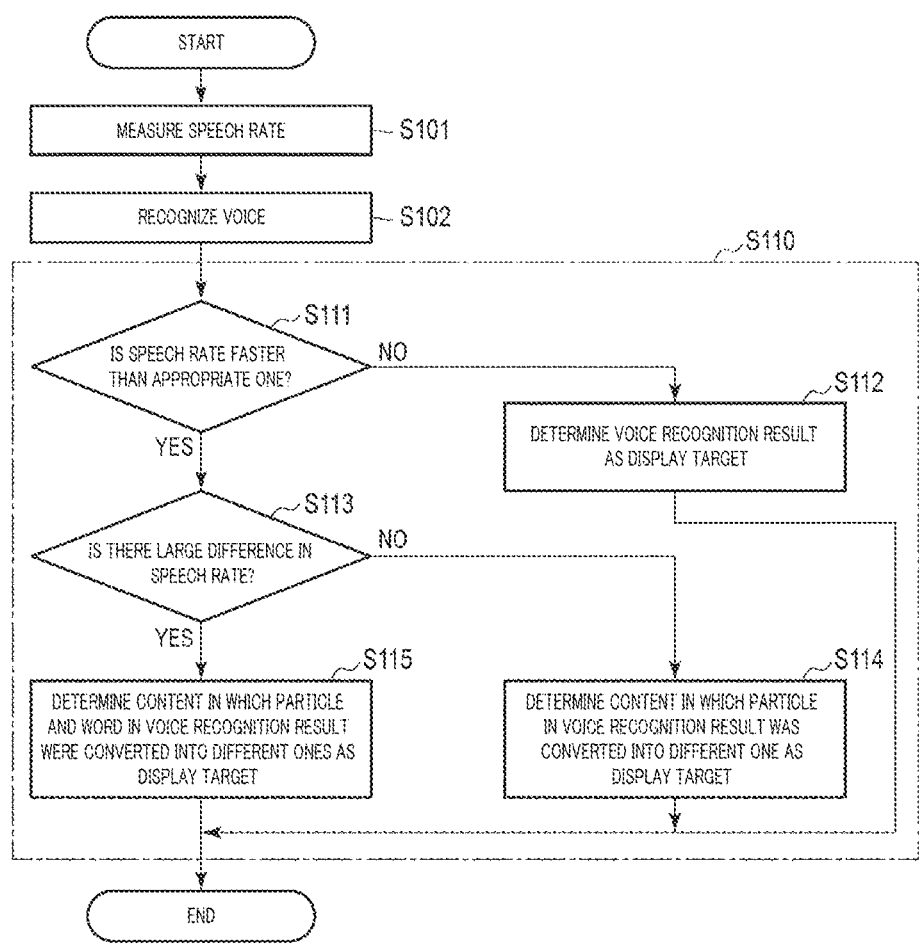

CONVERSATION ASSISTANCE DEVICE, CONVERSATION ASSISTANCE METHOD, AND PROGRAM

CROSS-REFERENCE TO RELATED APPLICATIONS

This application is a National Stage application under 35 U.S.C. § 371 of International Application No. PCT/JP2019/ 022720, having an International Filing Date of Jun. 7, 2019, which claims priority to Japanese Application Serial No. 2018-112706, filed on Jun. 13, 2018. The disclosure of the prior application is considered part of the disclosure of this application, and is incorporated in its entirety into this application.

TECHNICAL FIELD

The present invention relates to a conversation support device, a conversation support method, and a program.

BACKGROUND ART

There have increasingly been cross-cultural exchanges between remote areas, which leads to increased opportunities for communication between a native speaker (hereinafter referred to as "NS") and a non-native speaker (hereinafter referred to as "NNS") through video conversations using videophones and the like.

For an NNS who is not accustomed to a native language spoken by an NS, one of the major reasons why it is difficult to participate in communication is that the NS's high speech rate makes it hard to listen to the NS's speech. In such a case, the NS recognizes the existence of the NNS and then speaks slowly intentionally, which is effective in establishing a normal conversation. However, it may be difficult for the NS to control his/her speech at a rate different from usual.

In such a situation, there are proposed, for example, a technique of reducing the NS's speech rate to generate slow and easy-to-hear voice to communicate with the NNS (NPL 1), and a technique of displaying keywords in NS's speech to the NNS to be communicated (NPL 2).

With the former technique of generating slow and easy-to-hear voice to communicate with the NNS makes it possible for the NNS to listen to the speech slowly. However, the timing at which the NNS ends listening to NS's speech is later than the timing at which the NS ends his/her speech, which causes a problem that the NNS cannot reply timely and thus, smooth conversation is not established.

In the latter technique of displaying keywords to the NNS to be communicated, it is necessary for the NNS to pay attention to both the listening and the displayed character information, and also there is a problem that it is difficult to have smooth communication due to a lag time from the end of the NS's speech to the display output of a keyword.

CITATION LIST

Non Patent Literature

[NPL 1] Kazuki Osanai, Hiroko Tokunaga, Naoki Mukawa, Hiroto Saito, "Comparison on audio-visual synchronous/ asynchronous playback in real-time speech rate converted conversations: Will the speaker's addressing strength change?", 2017/4, pp. 1.
[NPL 2] Hiromi Hanawa, Xiaoyu Song, Tomoo Inoue, "Communication support by a native speaker's entering keywords on discussion with a non-native speaker: Effects of entering keywords by a native speaker on audio conference", 2016/5, pp. 140.

SUMMARY OF THE INVENTION

Technical Problem

As described above, it is difficult for people with different proficiency levels in a common language to have a smooth conversation.

The present invention has been made in view of the foregoing, and an object of the present invention is to provide a possible conversation support device, conversation support method, and program capable of implementing a communication with reasonably smooth conversation even between people having different proficiency levels in a common language.

Means for Solving the Problem

One aspect of the present invention includes a rate acquisition unit that acquires a speech rate of a speaker; a voice recognition unit that recognizes a voice on a speech content of the speaker; a processing unit that processes a part of a recognition result obtained by the voice recognition unit based on a result of comparing the speech rate acquired by the rate acquisition unit with a reference speech rate; and a presentation unit that presents to the speaker a voice recognition result having been processed by the processing unit.

Effects of the Invention

According to one aspect of the present invention, a result of recognizing a speech voice is processed as appropriate so that for example, the speech content after processing "rhymes" with the speech content before processing, and thus the content, in spite of being intentionally converted, can make an impression as if the system incorrectly recognized because of too fast speech of the speaker or unsmooth speaking. This makes it possible to encourage the speaker to reduce the speech rate naturally.

Therefore, it is possible to implement a communication with reasonably smooth conversation even between people having different proficiency levels in a common language.

BRIEF DESCRIPTION OF DRAWINGS

FIG. 1 is a diagram illustrating the overall configuration of a system according to an embodiment of the present invention.
FIG. 2 is a flowchart illustrating a processing content of determining a display content for a speaker, according to the embodiment.

DESCRIPTION OF EMBODIMENTS

In the following, an embodiment will be described in detail below with reference to the drawings by way of example in a case where the present invention is applied to a telephone call system having a videophone function via a server device connected to the Internet.

FIG. 1 is a diagram illustrating the overall configuration of a telephone call system including a conversation support device according to a positional embodiment of the present invention. In FIG. 1, communication terminals TM and TM, which are, respectively, possessed by two callers, are connected to a call support server SV serving as a conversation support device via a network NW.

The communication terminal TM is, for example, a smartphone, a feature phone, or a tablet terminal. It is a communication terminal such as a personal computer capable of making a call and executes a call function based on an application program installed therein in advance. The network NW includes a base station, the Internet and the like.

The call support server SV controls transmission and reception of video and voice between the communication terminals TM and TM performed by a videophone function during call, particularly, recognizes a voice processing using voice in a speech made on the speaker side, converts text characters based on the recognition result into an image, and superimposes the image on video for the speaker to transmit the resulting video.

The call support server SV includes an input and output control unit 11, a call voice processing unit 12, a call voice log update unit 13, a voice recognition unit 14, a call voice log database (DB) 15, and a voice recognition result database (DB) 16.

Among these functional units, the input and output control unit 11, the call voice processing unit 12, the call voice log update unit 13, and the voice recognition unit 14 are all implemented, for example, by a processor, included in the call support sever SV, executing a program stored in a program memory (not illustrated).

Further, the call voice log database (DB) 15 and the voice recognition result database (DB) 16 are built in a non-volatile memory writable and readable at any time such as an HDD (Hard Disk Device) or an SSD (Solid State Device).

The input and output control unit 11 controls transfer of various data and the like between the network NW and each of the call voice processing unit 12, the call voice log update unit 13, and the voice recognition unit 14.

The call voice processing unit 12 uses the call voice log update unit 13 and the voice recognition unit 14 to integratedly perform various types of processing related to voice during call continuation.

The call voice log update unit 13 causes the call voice log database 15 to store a call voice transmitted and received between the communication terminals TM and TM via the network NW in association with identification information of the speaker and time information for a certain amount of time as appropriate so that the call voice is updated therein.

Under the control of the call voice processing unit 12, the voice recognition unit 14 reads the call voice stored in the call voice log database 15, and recognizes a voice processing, and causes the voice recognition result database 16 to store the recognition result thus to be updated.

Next, the operation of the above embodiment will be described.

Note that, at the time of starting a call using the videophone function between the communication terminals TM, TM, the communication terminal TM operated by a user who serves as the NS side in a language as a common language used in the call displays a video on which a subtitle image for speech support is superimposed, for example, in response to a user's manual operation.

Further, instead of the user's manual operation on the NS side as described above, if a comparison between speech rates during a call indicates that the difference in speech rate between the two parties is significantly different over a certain threshold, the faster speech rate side may be automatically determined to be the NS user, and the communication terminal TM on the side determined to be that may be set to perform subtitle display for speech support.

In the call support server SV, during call between the communication terminals TM, TM, the call voice log update unit 13 causes the call voice log database 15 to store voice data transmitted and received in the call in association with the identification information of the speaker and the time information as appropriate through the input and output control unit 11 and the call voice processing unit 12 so that the date is updated, as described above.

In parallel with this update and storage operation in the call voice log update unit 13, the call voice processing unit 12 uses the voice data of the speaker set as an NS to perform processing for the speaker as illustrated in FIG. 2.

FIG. 2 is a flowchart illustrating a processing content of determining a display content when a display of speech support for the speaker is presented.

The call voice processing unit 12 causes the call voice log update unit 13 to read the latest voice data of the speaker who is the NS stored in the call voice log database 15, transfers the read voice data to the voice recognition unit 14, and causes the voice recognition unit 14 to measure the speech rate (step S101) and then perform voice recognition processing (step S102).

The call voice processing unit 12 compares the speech rate measured in step S101 with a reference speech rate set in advance, and then presents a result of voice recognition according to the comparison result to the speaker (Step S110).

Specifically, first, it is determined whether or not the measured speech rate is faster than the reference speech rate (step S111).

If it is determined that the measured speech rate is equal to the reference speech rate or is slower than the reference speech rate (NO in step S111), it is determined that it is not necessary particularly to encourage the speaker who is an NS to reduce the speech rate any more, and accordingly, the text characters of the recognition result obtained by the voice recognition processing is determined to be a display target without being processed (step S112).

On the other hand, if it is determined in step S111 that the measured speech rate is faster than the reference speech rate (YES in step S111), it is necessary for the call voice processing unit 12 to encourage the speaker who is an NS to reduce the speech rate any more.

Therefore, next in order to recognize the degree of rate, the call voice processing unit 12 determines whether or not the measured speech rate has a large difference from the reference speech rate depending on whether or not the measured speech rate is higher than a threshold for the reference speech rate (step S113). The threshold for the reference speech rate is, for example, a speech rate obtained by multiplying the reference speech rate by a constant of "1.5", which is larger than "1".

If it is determined that the measured speech rate is higher than the reference speech rate but is equal to or lower than the corresponding threshold and the difference from the reference speech rate is not so large (NO in step S113), the call voice processing unit 12 determines, to be a display target, a content that is intentionally converted in result of recognizing particle from a series of text characters resulting from the voice recognition by the voice recognition unit 14 (step S114).

In this case, the particle(s) after conversion of the recognition result "rhymes" with the particle (s) before conversion of the recognition result, and thus the particle(s), in spite of being intentionally converted, can make an impression as if the system incorrectly recognized because of too fast speech of the speaker or unsmooth speaking. This makes it possible to indirectly encourage the speaker to reduce the speech rate very naturally.

If it is determined in step S113 that the measured speech rate is higher than a threshold calculated from the reference speech rate and the difference from the reference speech rate is large (YES in step S113), the call voice processing unit 12 determines, to be a display target, a content that is intentionally converted in result of recognizing not only particle but also word section from a series of text characters resulting from the voice recognition by the voice recognition unit 14 (step S115).

Also in this case, the particle(s) and word(s) after conversion of the recognition result "rhymes" with the particle (s) and word(s) before conversion of the recognition result, and thus the particle(s) and word(s), in spite of being intentionally converted, can make an impression as if the system incorrectly recognized because of too fast speech of the speaker or unsmooth speaking. This makes it possible to indirectly encourage the speaker to reduce the speech rate very naturally.

The display target for voice recognition to be presented to the speaker is thus determined, and then the processing of FIG. 2 ends.

The call voice processing unit 12 converts the text characters resulting from the voice recognition determined to be the display target in any of steps S112, S114, and S115 into image data as subtitles in accordance with the speech rate considered appropriate. Then, the call voice processing unit 12 generates video data, to be displayed on the communication terminal TM of the speaker, in which the call partner appears and on which the image is superimposed and synthesized at an end area, for example, a lower end area, and transmits the resulting video to the communication terminal TM of the speaker to be displayed there.

Here, a unit based on the number of mora (beats) is conceivable as an appropriate speech rate used when converting text characters into image data as subtitles. That is, the number of mora is a unit of phrase of a sound having a certain time length on phonological theory. For example, for a foreigner listens to Japanese, the number of mora around "5" is considered to be appropriate.

Note that, in the description of the above-described embodiment, if it is determined that the speech rate of the speaker is slightly higher than the reference speech rate, the voice recognition result is processed to have a content different in particle. However, the present invention does not limit the part-of-speech as a processing target. Any partially-different recognition result may be presented as long as it is possible to encourage the speaker to reduce the speech rate naturally without feeling discomfort in a language that is a common language at that time.

In the present embodiment as described above in detail, the recognition result is processed as appropriate so that for example, the particle (s) and word (s) after processing "rhymes" with the particle(s) and word(s) before processing, and thus the particle(s) and word(s), in spite of being intentionally converted, can make an impression as if the system incorrectly recognized because of too fast speech of the speaker or unsmooth speaking. This makes it possible to indirectly encourage the speaker to reduce the speech rate very naturally. Therefore, it is possible to implement a communication with reasonably smooth conversation even between people having different proficiency levels in a common language.

Further, in the above-described embodiment, when the speech rate of the speaker is higher than the reference speech rate, the difference between the speech rates is determined by dividing the difference into multiple levels, degree of processing of the voice recognition result is divided into multiple levels depending on the degree of difference. Accordingly, the voice recognition result to be presented to the speaker matches more with the speech content as the speech rate is slower, and thus it is possible to encourage the speaker to speak slowly.

In addition, in the above-described embodiment, when the degree of processing is divided into multiple levels, the processing is performed according to part(s) of speech that constitute the voice recognition result. Accordingly, it is possible to reduce the processing load on the device side when the processing is performed on the voice recognition result and to continue the operation efficiently.

Note that, in the above-described embodiment, a case is described where a call using the videophone function is made between the two communication terminals via the server device connected to the Internet. However, the present invention is not limited to such a configuration, and may be applied to, for example, a system for transmitting and receiving video and voice between a large number of people, such as group video chat.

Furthermore, it may be implemented as a configuration in which an application program installed in advance in the device of each communication terminal instead of the server device connected to the network partially processes the voice recognition result of speech to be presented to the speaker. In that case, it is possible to perform the processing in the device of the communication terminal possessed by the speaker.

In addition, the present invention is not limited to the above-described embodiment, and various modifications are possible in practical applications without departing from the scope and spirit of the present invention. Further, the respective embodiments may be combined to implement as appropriate as much as possible, in which case the combined effects can be obtained. Furthermore, the above-described embodiments include inventions at various stages, and various inventions can be extracted by appropriately combining a plurality of disclosed constituent elements. For example, even if one or some constituent elements are removed from all the constituent elements illustrated in the embodiment, the configuration in which the one or some constituent elements are removed may be extracted as the invention as long as it can solve the problem described in the section of Technical Problem and has the effects described in the section of Effects of the Invention.

REFERENCE SIGNS LIST

11 Input and output control unit
12 Call voice processing unit
13 Call voice log update unit
14 Voice recognition unit
15 Call voice log database (DB)
16 Voice recognition result database (DB)
NW Network
SV Call support server
TM Communication terminal

The invention claimed is:
1. A conversation support device comprising:
a rate acquisition unit including one or more processors, that is configured to acquire a speech rate of a speaker;
a voice recognition unit, including one or more processors, that is configured to recognize a voice on a speech content of the speaker;

a processing unit, including one or more processors, that is configured to:
  compare the acquired speech rate to a reference speech rate;
  determine the acquired speech rate satisfies the reference speech rate;
  in response to determining the acquired speech rate satisfies the reference speech rate:
    determine a difference amount between the acquired speech rate and the reference speech rate;
    compare the difference amount to a threshold amount;
    in response to comparing, determine whether the difference amount satisfies the threshold amount;
    in response to determining the difference amount satisfies the threshold amount:
      generate content by converting a first portion of the acquired speech to textual data, wherein the textual data comprises (i) two or more words that rhyme with the first portion and (ii) the two or more words do not match the first portion;
      generate (i) video data of the speaker speaking the speech content and (ii) image data comprising subtitles of the generated content; and
a presentation unit that is configured to display, to a terminal of the speaker, the generated video data and the generated image data overlaid on the generated video data.

2. The conversation support device according to claim 1, wherein, when the speech rate acquired by the rate acquisition unit is faster than the reference speech rate, the processing unit processes the recognition result obtained by the voice recognition unit so as to process a degree of processing into multiple levels depending on a degree of difference between the speech rates.

3. The conversation support device according to claim 2, wherein the processing unit processes a degree of processing with respect to the recognition result by dividing the degree into multiple levels depending on a part of speech.

4. The conversation support device of claim 1, wherein the conversation support device is configured to convey a message to the speaker to reduce the speech rate by displaying, to the terminal of the speaker, the dissimilar textual data overlaid on the generated video data.

5. The conversation support device of claim 1, wherein the processing unit is further configured to:
  in response to determining the difference amount does not satisfy the threshold amount:
    generate content by converting a first portion of the acquired speech to textual data, wherein the textual data comprises (i) a word that rhymes with the first portion and (ii) the word is dissimilar to the first portion.

6. A conversation support method comprising:
  acquiring a speech rate of a speaker;
  recognizing a voice on a speech content of the speaker;
  comparing the acquired speech rate to a reference speech rate;
  determining the acquired speech rate satisfies the reference speech rate;
  in response to determining the acquired speech rate satisfies the reference speech rate:
    determining a difference amount between the acquired speech rate and the reference speech rate;
    comparing the difference amount to a threshold amount;
    in response to comparing, determining whether the difference amount satisfies the threshold amount;
    in response to determining the difference amount satisfies the threshold amount:
      generating content by converting a first portion of the acquired speech to textual data, wherein the textual data comprises (i) two or more words that rhyme with the first Wortion and (ii the two or more words do not match the first portion;
      generating (i) video data of the speaker speaking the speech content and (ii) image data comprising subtitles of the generated content; and
      displaying, to a terminal of the speaker, the generated video data and the generated image data overlaid on the generated video data.

7. A non-transitory computer-readable medium storing software comprising instructions executable by one or more computers which, upon such execution, cause the one or more computers to perform operations comprising:
  acquiring a speech rate of a speaker;
  recognizing a voice on a speech content of the speaker;
  comparing the acquired speech rate to a reference speech rate;
  determining the acquired speech rate satisfies the reference speech rate;
  in response to determining the acquired speech rate satisfies the reference speech rate:
    determining a difference amount between the acquired speech rate and the reference speech rate;
    comparing the difference amount to a threshold amount;
    in response to comparing, determining whether the difference amount satisfies the threshold amount;
    in response to determining the difference amount satisfies the threshold amount:
      generating content by converting a first portion of the acquired speech to textual data, wherein the textual data comprises (i) two or more words that rhyme with the first portion and (ii) the two or more words do not match the first portion;
      generating (i) video data of the speaker speaking the speech content and (ii) image data comprising subtitles of the generated content; and
      displaying, to a terminal of the speaker, the generated video data and the generated image data overlaid on the generated video data.

* * * * *